Dec. 26, 1967     D. T. AYERS, JR     3,360,084
AUTOMATIC BRAKE ADJUSTER
Filed July 14, 1966     4 Sheets-Sheet 1
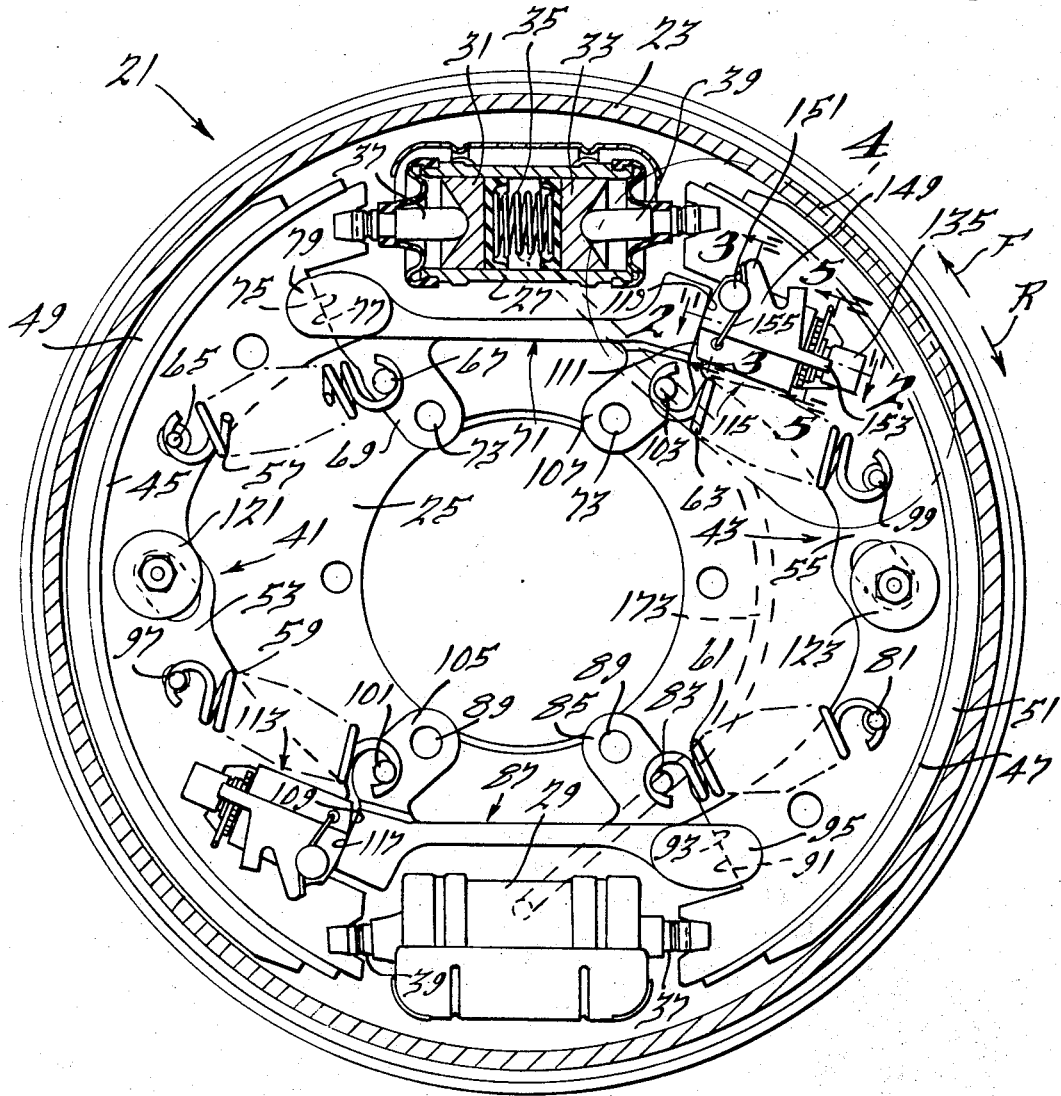
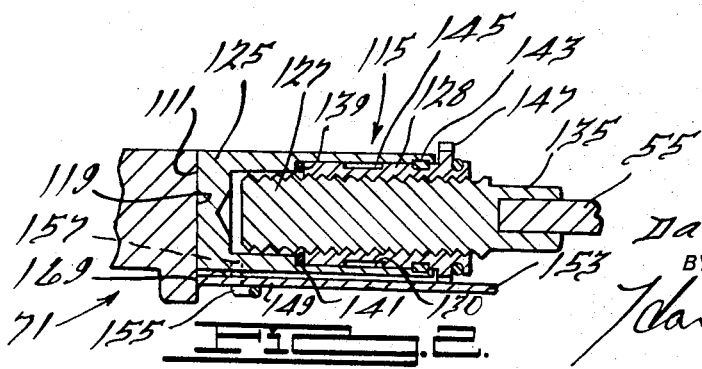
INVENTOR.
David T. Ayers, Jr.
BY
ATTORNEYS

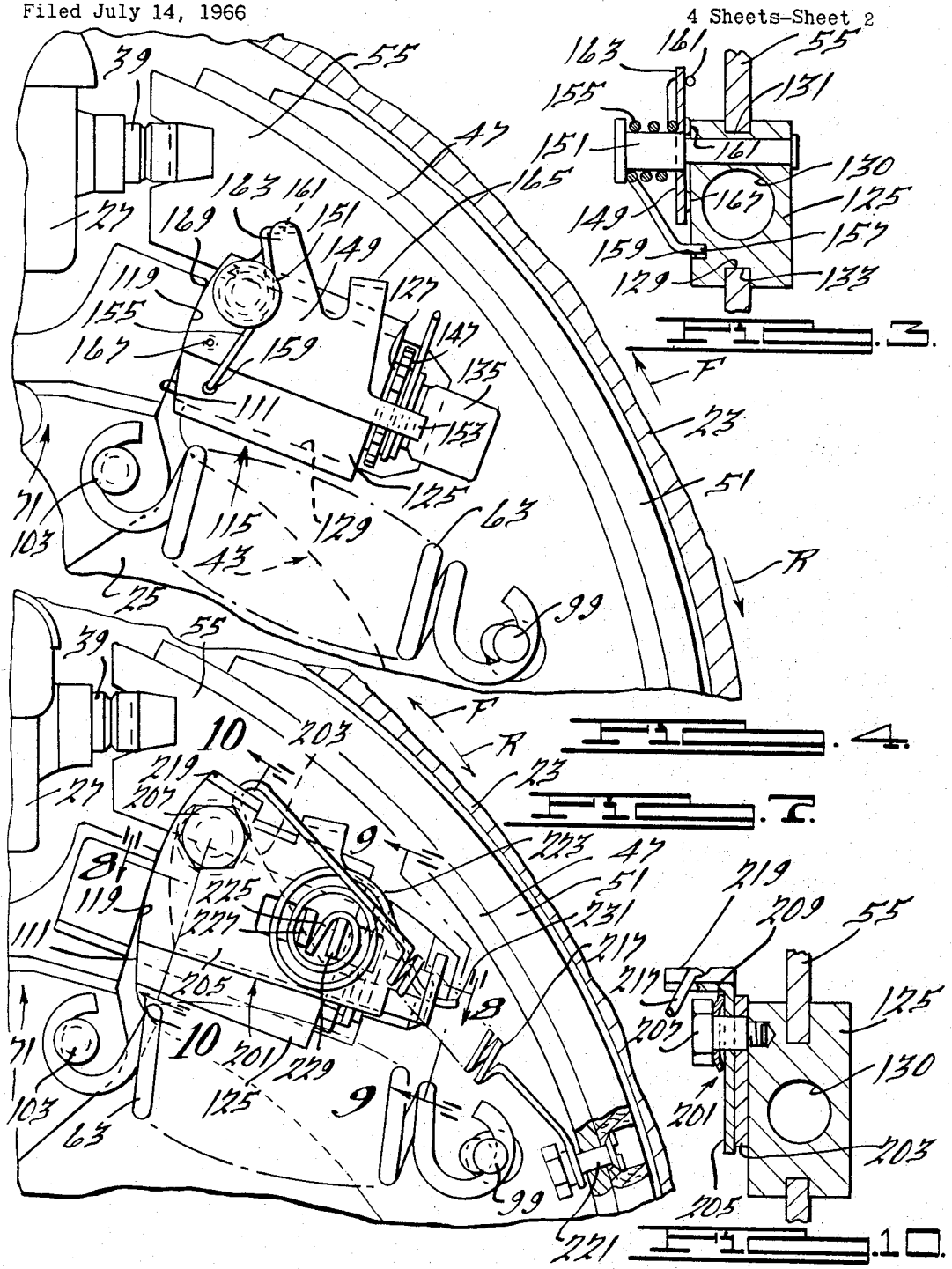

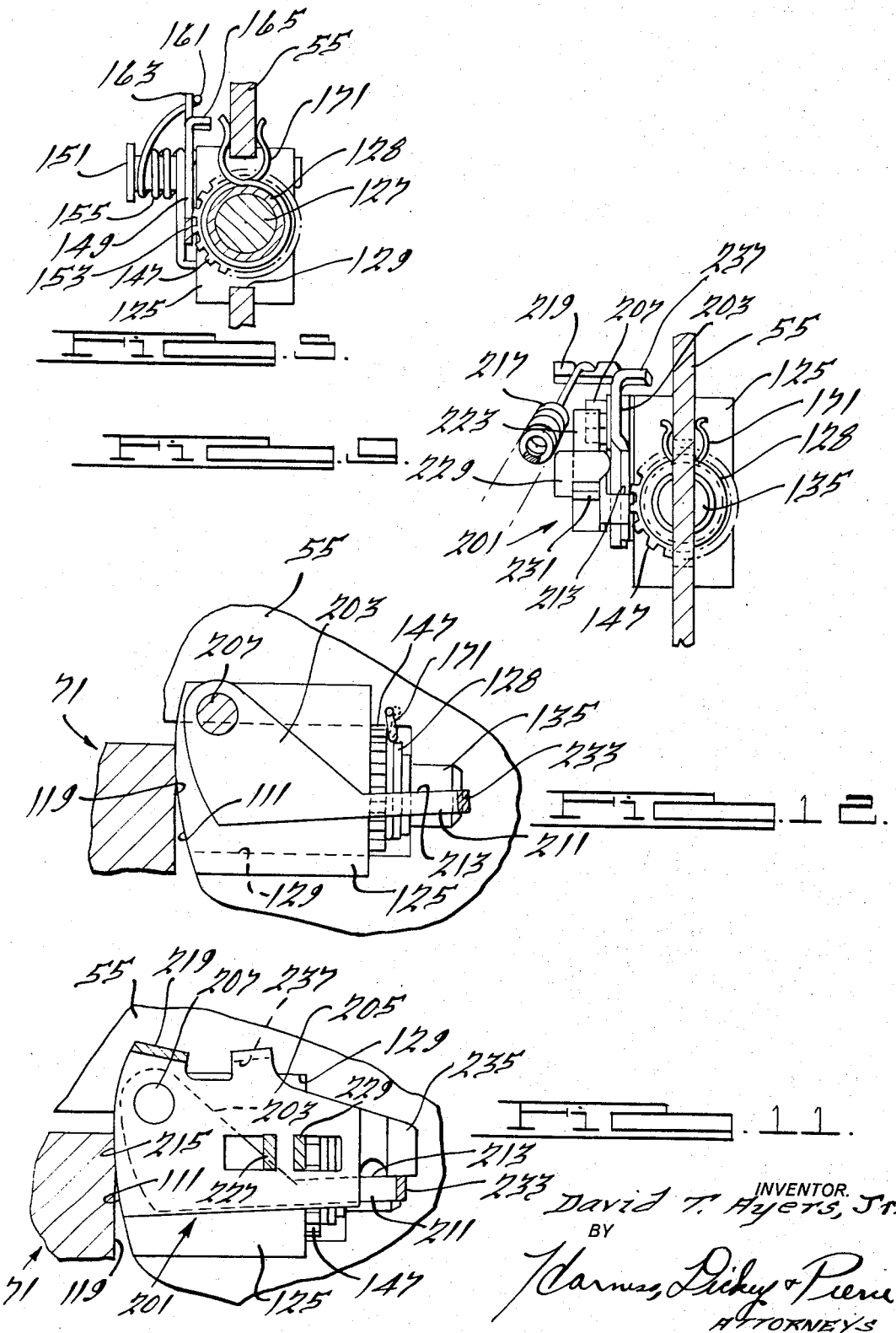

Dec. 26, 1967     D. T. AYERS, JR     3,360,084
AUTOMATIC BRAKE ADJUSTER
Filed July 14, 1966     4 Sheets-Sheet 4
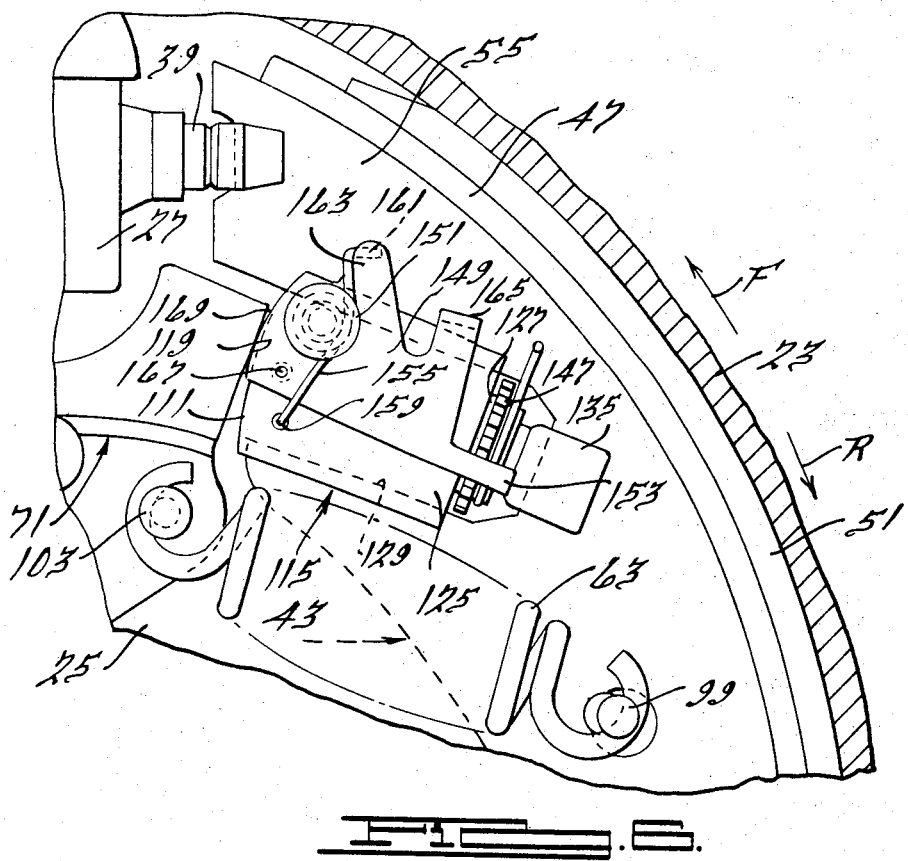
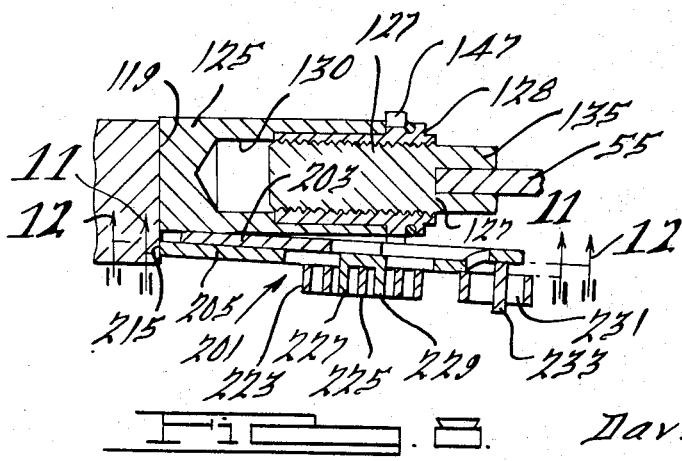
INVENTOR.
David T. Ayers, Jr.
BY
Barnes, Dickey & Pierce
ATTORNEYS

United States Patent Office 3,360,084
Patented Dec. 26, 1967

3,360,084
AUTOMATIC BRAKE ADJUSTER
David T. Ayers, Jr., Birmingham, Mich., assignor to Kelsey-Hayes Company, Romulus, Mich., a corporation of Delaware
Filed July 14, 1966, Ser. No. 565,293
8 Claims. (Cl. 188—79.5)

ABSTRACT OF THE DISCLOSURE

Several embodiments of automatic adjusting drum type brakes. In each embodiment, an adjusting device is carried by one of the brake shoes and transmits torque reactions from the brake shoe to a fixed torque resisting means. The automatic adjusting device in each embodiment includes two extensible members and an automatic adjusting means that is indexed for effecting the adjustment upon reverse application of the brakes and which effects the adjustment upon retraction of the brake shoe.

---

This invention relates generally to vehicle brakes, and particularly to an improved automatic brake adjuster for drum-type brakes.

An important object of the present invention is to provide an improved, compact drum brake adjusting device disposed at one end of the brake shoes and operable to automatically reposition brake shoes relative to a brake drum to compensate for brake lining wear.

Another important object of the present invention is to provide an improved brake adjuster of the above character which is adapted for use with drum-type brakes having a floating or shifting anchor for the brake shoes.

Still another object of the present invention is to provide an improved brake adjuster of the above character which is operative during reverse vehicle movement and which does not affect normal brake operation during either forward or reverse vehicle movement.

Still another object of the present invention is to provide an improved brake adjuster of the above character adapted to prevent undue part stress if adjustment is not carried out.

Further objects of the present invention include the provision of an automatic brake adjuster of the above character which is relatively inexpensive to manufacture, rugged in construction and reliable in use.

Other objects and advantages of the present invention will become more apparent from a consideration of the following detailed description taken in conjunction with the drawings in which:

FIGURE 1 is a sectional view of a drum-type vehicle brake embodying a preferred form of the present invention;

FIG. 2 is an enlarged sectional view of FIG. 1 taken along the line 2—2 thereof;

FIG. 3 is an enlarged sectional view of FIG. 1 taken along the line 3—3 thereof;

FIG. 4 is an enlarged view of a portion of FIG. 1 taken within the enclosure 4 thereof and shown with the brakes in a released position;

FIG. 5 is an enlarged sectional view of FIG. 1 taken along the line 5—5 thereof;

FIG. 6 is a view similar to FIG. 4 showing the parts in position with the brakes "on" during reverse vehicle movement;

FIG. 7 is a view similar to FIG. 4 illustrating a modified form of the present invention;

FIG. 8 is a sectional view of FIG. 7 taken along the line 8—8 thereof;

FIG. 9 is a sectional view of FIG. 7 taken along the line 9—9 thereof;

FIG. 10 is a sectional view of FIG. 7 taken along the line 10—10 thereof;

FIG. 11 is a sectional view of FIG. 8 taken along the line 11—11 thereof; and

FIG. 12 is a sectional view of FIG. 8 taken along the line 12—12 thereof.

Broadly described, the present invention comprises a rotatable brake drum, a fixed torque resisting means and a brake shoe within said drum engageable with said torque resisting means and movable into engagement therewith, variable length means carried by said brake shoe and including first and second longitudinally adjustable members engaging said torque resisting means and said brake shoe, lever means carried by one of said members and engaging said torque resisting means, said lever means being operatively engaged with the other of said members and adapted to longitudinally adjust said members upon movement of said lever means a predetermined amount in one direction relative to said variable length means, said lever means being movable in a direction opposite to said one direction upon movement of said brake shoe away from said torque resisting member and in said one direction upon movement of said brake shoe toward said torque resisting member whereby to elongate said variable length means.

Referring now more particularly to the drawings, a vehicle wheel brake embodying the present invention is illustrated generally at 21 in FIG. 1 and is seen to include a brake drum 23 operatively secured to a wheel (not shown) for rotation about a central axis. A stationary backing plate 25 is fixed to a nonrotatable part of the vehicle (not shown). A pair of wheel or brake cylinders 27, 29 is fixed to the backing plate 25 and each of the cylinders is provided with a pair of pistons 31, 33 urged apart by a light compression spring 35. The pistons 31, 33 operate plungers 37, 39 extending from opposite ends of the cylinders 27, 29.

A pair of arcuately shaped brake shoes 41, 43 is provided with rim portions 45, 47 upon which are fixed brake linings 49, 51, respectively. The rim portions 45, 47 are reinforced and supported against flexure by web portions 53, 55 extending generally perpendicular thereto. The outer ends of the plungers 37, 39 are bifurcated and engage the web portions 53, 55, as seen in FIG. 1, so that when hydraulic fluid is delivered to the cylinders 27, 29, such as from a conventional pedal operated master cylinder, the pistons 31, 33 are moved apart and press the brake linings 49, 51 into frictional engagement with the brake drum 23. The brake shoes 41, 43 are retracted and the brake linings 49, 51 held normally spaced from the brake drum 23 and against fixed anchor or torque resisting means, to be described, by tension return springs 57, 59 and 61, 63, respectively.

As seen in FIG. 1, the return spring 57 has one end hooked to a pin 65 on the brake shoe web 53 and its other end is hooked to a pin 67 on an arm 69 of a torque resisting member 71 which in turn is fixed to the backing plate 25 by bolts 73 or the like. The spring 57 normally hold an abutment surface 75 on the brake shoe web 53 seated against an anchor surface 77 formed at the base of a slotted end 79 of the torque resisting member 71. In similar fashion, the return spring 61 has one end hooked to a pin 81 on the brake shoe web 55 and its other end hooked to a pin 83 on an arm 85 of another torque resisting member 87 fixed to the backing plate 25 by bolts 89. This spring 61 normally holds an abutment surface 91 on the brake shoe web 53 seated against an anchor surface 93 at the base of a slotted end 95 of the torque resisting member 87. The springs 59, 63 have one end hooked to pins 97, 99 on the brake shoe webs 53, 55 and their other ends are hooked to pins 101, 103 secured to arms 105, 107 forming part of the torque resisting members 71, 87, respectively. The springs 59, 63 normally hold abutment surfaces 109, 111 of anchor members 113, 115 carried by the brake shoe webs 53, 55 seated against anchor surfaces 117, 119 on the torque resisting members 87, 71, respectively. Conventional hold-down devices 121, 123 hold the brake shoes 41, 43 in proper relation to the backing plate.

It will be appreciated that when the brakes are "off," the brake shoes 41, 43 seat against the fixed anchor surfaces 77, 117 and 93, 119, respectively. Thus, the radial travel of the brake shoes 41, 43 required to bring the linings 49, 51 into contact with the brake drum increases as the brake linings wear. The pedal travel needed to effect brake energization is directly proportional to radial travel of the brake shoes 41, 43 so that it is desirable to maintain this brake shoe travel relatively constant in order that the brake pedal travel stay within suitable limits.

To this end, each of the anchor member 113, 115 is adjustable so that its length can be varied. This, in turn, adjusts the radial position of the brake shoes 41, 43 relative to the drum 23 when the brakes are off so that by selective longitudinal adjustment of the anchor members 113, 115 as the linings 49, 51 wear, the required brake pedal travel may be held relatively constant. The anchor members 113, 115, the adjusting mechanism therefor and the mode of operation thereof are identical so that a detailed description of the anchor member 115, its adjustment and mode of operation will suffice here. It is to be understood that like numerals in the drawings refer to like parts for both anchor members 113, 115 as well as the adjusting mechanism therefor.

Turning now to FIGS. 2–5, the anchor member 115 is seen to include an anchor block 125 having a threadedly engaged shank 127 and nut 128 positioned in an opening 130 therein. The anchor block 125 is slidably received in a slot 129 formed in the brake shoe web 55 by being slotted along its top and bottom at 131, 133 (FIG. 3). As seen in FIGS. 2 and 4, the outer end of the anchor block 125 is arcuately shaped to define the abutment surface 111 which engages the anchor surface 119. The outer end 135 of the threaded shank 127 is bifurcated to receive the brake shoe web 55 therebetween and hold the shank 127 against rotation. The nut 128 has its inner end 137 positioned adjacent a shoulder 139 in the anchor block opening 130 and is spaced therefrom by an annular antifriction ring 141. Another antifriction ring 143 is retained between the nut 128 and the anchor block 125 to prevent axial movement between these parts. The outer surface of the nut 128 may have an annular pocket 145 therein for the reception of grease to insure easy turning movement between the nut 128 and anchor block 125.

It will be seen that by turning the nut 128, the axial position of the shank 127 relative thereto, and to the anchor block 125 is adjusted and the length of the anchor member 115 is varied. Specifically, by turning the nut 128 in a direction to move the shank 127 toward the right, as seen in FIGS. 2 and 4, the brake shoe 43 is adjusted radially outwardly toward the brake dum 23. The nut 128 is provide with a toothed wheel 147 which extends laterally beyond the anchor block 125. As is conventional, the nut 128 can be turned manually by inserting a tool through an opening (not shown) in the backing plate 25 and turning the toothed wheel 147. However, according to the present invention, the nut 128 is adapted to be turned automatically as the brake lining 51 wears to effect brake adjustment.

To this end, a lever 149 is pivotally mounted on the anchor block 125 by a pin 151 and has a projecting finger 153 positioned to interferingly engage the toothed wheel 147. A torsion spring 155 is positioned on the pin 151 and has one end 157 received in an opening 159 in the anchor block 125 and its other end 161 positioned behind an ear 163 on the link 149. The spring 155 normally biases the lever 149 in a clockwise direction about the pin 151, as seen in FIG. 4, and in additon, resiliently biases the lever toward the anchor block 125. The lever 149 has a laterally projecting ear 165 adapted to engage the top of the anchor block 125 to limit clockwise turning movement of the lever 149 and to position it during assembly and disassembly, and may be provided with lateral projections 167 to reduce surface contact with the anchor block 125.

The lever 149 has an arcuately shaped edge 169 positioned to engage the anchor surface 119 on the torque resisting member 71 and is normally held so engaged under the resilient action of the torsion spring 155 (FIGS. 1 and 4). In this position, the brakes are "off" and the upper edge of the projecting finger 153 is located at substantially the mid or high point on the toothed wheel 147. When the brakes are energized, the brake shoe 43 moves radially outwardly until the brake lining 51 engages the brake drum 23. This causes the brake shoe web 55 and the anchor block 125 also to move radially outwardly away from the anchor surface 119 so that the lever 149 can swing about the pivot 151 under the action of the spring 155. The edge 169 of the lever remains in contact with the anchor surface 119 so that the extent of pivotal movement of the lever 149 allowed by radial brake shoe movement is a function of the degree to which the brake lining 51 is worn.

In addition to radial brake shoe movement, frictional engagement between the lining 51 and drum 23 causes the brake shoe 43 to move in the same direction the drum 23 is turning, which is in the direction of the arrow F shown in FIGS. 1, 4 and 6 when the vehicle is moving in a forward direction, and in the direction of the arrow R when the vehicle is moving in the reverse direction. During forward vehicle movement, these frictional forces move the brake shoe 43 and therefore the anchor block 125 and the lever 149 toward the anchor surface 119. Thus, even when the brake lining 51 has worn and the brake shoe 43 moves a substantial amount in a radial direction, the lever 149 is prevented from pivoting to any great extent about the pin 151 under the force of the spring 155 since the lever edge 169 remains close to the anchor surface 119. However, when the brakes are energized during reverse vehicle movement, the anchor block 125 and therefore the level 149 move both radially outwardly and in an arcuate direction away from the anchor surface 119. Since the spring 155 biases the lever in a direction holding the lever edge 169 against the anchor surface 119, the lever 149 pivots in a clockwise direction, as seen in FIGS. 4 and 6, each time the brakes are applied when the vehicle is moving in a reverse direction. Thereafter, when the brakes are released, the brake shoe 43 moves radially inwardly under the force of the return springs 61, 63 causing the lever 49 to pivot in a counterclockwise direction and return to the position shown in FIG. 4.

When the brake lining 51 is new, the radial movement undergone by the brake shoe 43 during brake application is small so that even when the brakes are applied during reverse vehicle movement, the movement of the anchor block 125 relative to the anchor surface 119, resulting from both radial and turning movement of the brake shoe 43, is relatively small. The pivotal movement of the lever 149 is correspondingly small at this time and is not sufficient to impart any adjusting effect on the nut 128. As the brake lining 51 wears, the radial movement of the brake shoe 43 increases as does the movement of the anchor block 125 away from the anchor surface 119. This, in turn, increase the pivotal movement of the lever 149 until the finger 153 moves sufficiently far to engage a new tooth on the toothed wheel 147 during brake application (FIG. 6). Thereafter, when the brakes are released, the return springs 61, 63 retract the brake shoe 43 radially inwardly and when the lever 149 is pivoted back to the position illustrated in FIG. 4, the finger 153 indexes the wheel 147 and the nut 128 a distance of one tooth. Since the shank 127 is nonrotatable, this turning movement of the nut 128 adjusts the shank 127 toward the right and the anchor block 125 toward the left as seen in FIG. 2, thereby adjusting the brake shoe 43 radially outwardly to compensate for wear of the lining 51. A clip spring 171, shown in FIGS. 4 and 5, surrounds the nut 128 adjacent the toothed wheel 147 and prevents the nut 128 from turning movement of the lever 149 in a clockwise direction, as seen in FIG. 4.

It will be appreciated that although radial adjustment of the brake shoe 43, and also the brake shoe 41 since the adjusting structure therefor is identical, is effected initially at one end of the brake shoe, this radial adjustment is distributed equally to both ends of the shoe 43, and the shoe 41, the next time the brakes are energized. This occurs by reason that the wheel cylinders 27, 29 are hydraulically interconnected by a conduit 173. This causes equal pressure to exist in the cylinders 27, 29 so that equal forces are applied to each end of the brake shoes 41, 43 at each brake application. The floating nature of the brake shoe actuating plungers 37, 39 and of the brake shoes 41, 43 themselves automatically reposition the shoes angularly upon application of the brakes. Thereafter, when the brakes are released, the brake shoe return springs act equally on both ends of the brake shoes and position both ends of the shoes 41, 43 at uniform radial distances from the drum 23.

A modified form of the present invention is illustrated in FIGS. 7–12 and since the basic brake and wheel structure of this embodiment is the same as that of FIGS. 1–6, a detailed description thereof is omitted here, it being understood that like numerals refer to like parts in all the figures.

As shown best in FIGS. 7, 8 and 10 the brake shoe 43 has an achor block 125 supported in a slot 129 in the brake shoe web 55 in the same fashion as in the embodiment of FIGS. 1–6. The anchor block 125 has an arcuate surface 111 at one end positioned to abut the anchor surface 119 on the torque resisting member 71 and rotatably receives the internally threaded nut 128 at its other end. A threaded shank 127 is received in the nut 128 and has a bifurcated outer end 135 receiving an adjacent end of the brake shoe web 55. By turning the nut 128 in a direction causing the shank 127 to move toward the right, as seen in FIGS. 6 and 8, the brake shoe 43 is adjusted radially outwardly toward the brake drum 23 to take up wear in the lining 51.

To effect this adjustment, the nut 128 is provided with a toothed wheel 147 which extends laterally beyond the anchor block 125 and which is adapted to be engaged by a lever, indicated generally at 201, during one phase of brake operation. The lever 201 is seen to include first and second portions 203, 205, each of which is pivotally mounted on the anchor block 125 by a pivot screw 207. A Belleville washer 209 is positioned between the head of the screw 207 and the outermost lever portion 205 to permit some lateral flexing of the lever portions 203, 205.

The lever portion 203 is provided with a forwardly projecting finger 211 adapted to interferingly engage the toothed wheel 147. The finger 211 normally is positioned, as shown in FIG. 12, with its upper edge 213 substantially at the mid or high point of the toothed wheel 147. When the lever portion 203 is first pivoted in a clockwise direction about the pivot 207 to an extent sufficient to lower the finger edge 213 and bring it into contact with a new tooth on the wheel 147, subsequent counterclockwise pivotal movement of the lever portion 203 to reposition it as shown in FIG. 12 causes the nut 128 to be indexed a distance of one tooth on the wheel 147. This, in turn, effects the desired radial adjustment of the brake shoe 43.

The lever portion 205 has an arcuate end edge 215 positioned to engage the anchor surface 119 on the torque resisting member 71 and is normally biased into engagement therewith by a tension spring 217 having one end hooked to a lateral projection 219 on the lever portion 205 and its other end hooked to a bolt 221 on the brake shoe rim 47. The lever portions 203, 205 are resiliently interconnected by a spiral torsion spring 223 having its inner end 225 held between a pair of projections 227, 229 on the lever portion 205 and its outer end 231 positioned beneath a lateral projection 233 on the lever finger 211. Upward or counterclockwise pivotal movement of the lever portion 203 under the force of the torsion spring 223 is limited by engagement between the lateral projection 233 and a forward portion or finger 235 on the lever portion 205 (FIG. 11). A lateral projection 237 on the lever portion 205 limits pivotal movement thereof in a clockwise direction and helps hold the parts in position during assembly and disassembly.

In use, the parts are normally positioned as shown in the figures with the brakes released. When the brakes are energized the brake shoe 43 and the anchor block 125 move radially outwardly until the brake lining 51 contacts the brake drum 23. During forward vehicle movement, the brake drum 23 turns in the direction of the arrow F shown in FIG. 7 so that when the lining 51 contacts the brake drum, frictional forces therebetween cause the brake shoe 43 and the anchor block 125 also to move in this direction. This holds the anchor block abutment surface 111 against the anchor surface 119. The arcuate surface 215 on the lever portion 205 is substantially coextensive with the anchor block abutment surface 111 so that as long as the latter remains in contact with the anchor surface 119, the lever portion 205 and therefore the lever portion 203 will not pivot to any great extent about the screw 207.

During reverse vehicle movement, the brake drum 23 turns in the direction of the arrow R shown in FIG. 7 so that now when the brakes are applied, the brake shoe 43 and the anchor block 125 move in the same direction and the abutment surface 111 on the anchor block moves away from the anchor surface 119. In addition, radial outward movement of the brake shoe 43 during brake actuation moves the anchor block 125 away from the anchor surface 119. When the combined effect of these movements reaches a preselected extent, i.e., when the brake lining 51 has become worn, the lever portion 205 pivots in a clockwise direction (FIG. 11) to an extent where the upper surface 213 on the lever finger 211 moves past and engages a new tooth on the wheel 147. Thereafter, when the brakes are released, the brake shoe 43 moves radially inwardly and is released from the brake drum 23 so that the abutment surface 111 on the anchor block 125 is again seated against the anchor surface 119. This causes the lever portion 205 to pivot in a counterclockwise direction and be repositioned as shown in FIG. 11.

During this return movement of the lever portion 205, the torsion spring 223 is wound and exerts a force on the lever portion 203 tending to turn it also in a counterclockwise direction about the pivot 207 (FIGS. 11 and 12). If the lever portion 203 so turns, it indexes the nut 128 a distance of one tooth on the wheel 147 and radially adjusts the brake shoe 43 by moving the shank 127 toward the right as seen in FIG. 8. However, if the nut 128 is not free to turn, for example, as a result of compressive loading of the shank 127 and the nut 128, the lever portion 203 does not turn and the spiral spring 223 remains slightly wound. Continued use of the brakes causes the brake lining 51 to wear still further until eventually the lever finger 211 engages still another new tooth on the wheel 147. This effects further winding of the spiral spring 223 so that a still greater force is imposed on the nut 128 tending to index it and adjust the brake shoe 43. When the nut 128 finally is indexed, the spiral spring 223 is relaxed.

The embodiment of FIGS. 7–12 has been found particularly useful in installations where severe axial loading of the adjusting screw occurs since it prevents the lever 201 from bending or breaking during use. In addition, the structure of this embodiment possesses the advantages set out above for the embodiment of FIGS. 1–6.

By the foregoing, there has been disclosed an improved automatic brake adjuster calculated to fulfill the inventive objects set forth and while preferred embodiments of the present invention have been illustrated and described above in detail, various additions, substitutions, modifications and omissions may be made thereto without departing from the spirit of the invention as encompassed by the appended claims.

What is claimed is:

1. A self adjusting drum type brake for coaction with a rotatable brake drum, said brake comprising a fixed torque resisting means, a brake shoe carrying a lining and supported within the drum for movement of said lining from a retracted position into engagement with the drum, an automatic adjusting device carried by said brake shoe and interposed between said brake shoe and said torque resisting means for precluding rotation of said brake shoe in at least one direction and for automatically compensating for wearing of said lining, said automatic adjusting device comprising a first member abuttingly engaged with said brake shoe, a second member adapted to abuttingly engage said fixed torque resisting means, said first and said second members being extensible for compensating for wear of said lining, automatic adjusting means carried by one of said members for movement between first and second positions, said automatic adjusting means having a first portion adapted to engage said torque resisting means and a second portion for incrementally extending said first and said second members relative to each other upon movement of said automatic adjusting means from its first position to its second position, and biasing means engaging said automatic adjusting means for urging said first portion into engagement with said torque resisting means for moving said automatic adjusting means from its second position to its first position upon movement of said second member relative to said torque resisting means a distance greater than a predetermined distance and upon predetermined wear of said lining, and retraction spring means engaging said brake shoe for returning said brake shoe to a disengaged position, for urging said second member into engagement with said fixed torque resisting means, and for moving said automatic adjusting means from its first position to its second position after said biasing means has moved said automatic adjusting means from its second position to its first position whereby adjustment of said automatic adjusting device is effected upon retraction of said brake shoe.

2. A device as defined in claim 1 wherein the automatic adjusting means comprises a lever pivotally supported by said one member for movement between its first and second positions.

3. A device as defined in claim 1 wherein said first member includes a block slidable on said brake shoe and having an abutment surface engageable with said torque resisting means, said second member including a threaded shank adjustable longitudinally of said block and engageable with said brake shoe, said automatic adjusting means including a lever pivotally mounted on said block and operatively engaging said shank to adjust said shank longitudinally relative to said block and said brake shoe radially of said drum.

4. A device as defined in claim 3 which includes a nut threadedly receiving said shank and rotatably supported in and axially engaging said block, said lever engaging said nut, said shank nonrotatably engaging said brake shoe.

5. A device as defined in claim 4 wherein said nut includes a toothed wheel, said lever interferingly engageable with said wheel.

6. In a brake of the type having a rotatable brake drum, a fixed torque resisting means and a brake shoe within said drum engageable with said torque resisting means and movable into engagement therewith, variable length means carried by said brake shoe and including first and second longitudinally adjustable members engaging said torque resisting means and said brake shoe, lever means pivotally mounted on one of said members and engaging said torque resisting means, said lever means being operatively engaged with the other of said members and adapted to longitudinally adjust said members upon movement of said lever means a predetermined amount in one direction relative to said variable length means, said lever means being movable in a direction opposite to said one direction upon movement of said brake shoe away from said torque resisting member and in said one direction upon movement of said brake shoe toward said torque resisting member whereby to elongate said variable length means, said lever means includes first and second resiliently connected portions, said first portion engaging said torque resisting means and said second portion engaging said other member.

7. A device as defined in claim 6 which includes spring means interconnecting said first and second portion and biasing said second portion in said opposite direction.

8. A device as defined in claim 7 which includes spring means biasing said first portion in said one direction and into engagement with said torque resisting means.

References Cited

UNITED STATES PATENTS

| | | | |
|---|---|---|---|
| 2,292,017 | 8/1942 | Smith | 188—79.5 |
| 3,169,610 | 2/1965 | Gold | 188—79.5 |

DUANE A. REGER, *Primary Examiner.*